United States Patent [19]

Degré et al.

[11] Patent Number: 4,466,068
[45] Date of Patent: Aug. 14, 1984

[54] APPARATUS FOR THE DETECTION AND PREVENTION OF COLLISION RISKS IN DEEP SEA AND COASTAL NAVIGATION

[76] Inventors: Thomas Degré, 32-36 Rue du Borrego, F-75020 Paris; Francois Lefevre, 14 Allée du Chevrefevilles, 14100 Caen; Xavier Lefevre, 226 Rue du Faubourg, Saint-Antoine, F-75012 Paris, all of France

[21] Appl. No.: 232,049

[22] PCT Filed: May 29, 1980

[86] PCT No.: PCT/FR80/00087
§ 371 Date: Jan. 31, 1981
§ 102(e) Date: Jan. 26, 1981

[87] PCT Pub. No.: WO80/02743
PCT Pub. Date: Dec. 11, 1980

[30] Foreign Application Priority Data

May 31, 1979 [FR] France .................. 79 14036

[51] Int. Cl.³ .............. G06F 15/50; G01C 21/20; G01S 13/93
[52] U.S. Cl. .................. 364/461; 343/7 A; 343/455; 364/460
[58] Field of Search ........... 364/460, 461; 343/7 A, 343/5 EC, 455; 33/431

[56] References Cited

U.S. PATENT DOCUMENTS

| | | | |
|---|---|---|---|
| 2,717,448 | 9/1955 | Lubin et al. | 33/431 |
| 3,706,136 | 12/1972 | Sielaff | 33/431 X |
| 3,959,793 | 5/1976 | Litchford | 343/6.5 R |
| 4,153,935 | 5/1979 | Jones et al. | 364/461 |
| 4,163,972 | 8/1979 | Lapy et al. | 364/461 X |
| 4,205,313 | 5/1980 | Pease | 343/5 EM |
| 4,208,805 | 6/1980 | McEwen | 33/431 |
| 4,313,115 | 1/1982 | O'Sullivan | 343/5 EM |

FOREIGN PATENT DOCUMENTS

| | | |
|---|---|---|
| 1187140 | 2/1965 | Fed. Rep. of Germany . |
| 1365508 | 9/1974 | United Kingdom . |
| 1541549 | 3/1979 | United Kingdom ............ 364/461 |
| 2020938 | 11/1979 | United Kingdom . |

OTHER PUBLICATIONS

Matusche: "Kollarm", Ein neues Kollisionswarngerät Luftfahrttechnik-Raumfahrttechnik, vol. 9, No. 2, Feb. 1963, pp. 54/63.
Schindler et al.: Verfahrens und Gerätetechnische Probleme der Teilautomatischen Radarauswertung für den Kollisionschutz auf See. Nachrichtentechnik, vol. 17, No. 8, 1967, pp. 294-300.
Annen: Schiffe bei Radarfahrt: Antikollision nach der Kollisionsmethode, Schiff & Hafen, vol. 26, No. 7, 1974, pp. 664/665.
Degre-Lefevre: A New Collision Avoidance System of the O.R.I.O.N. Association, pp. 1-20.

Primary Examiner—Felix D. Gruber
Attorney, Agent, or Firm—Sughrue, Mion, Zinn, Macpeak and Seas

[57] ABSTRACT

Apparatus for the detection and prevention of collision hazards between a ship fitted with a radar on board and moving or fixed obstacles identified on the radar screen on board of the ship, consists in determining with respect to said obstacles, taking into account such parameters as distance, speed and heading thereof, dangerous sectors of the heading and the speed for said ship, plotting said dangerous sectors for the heading and the speed on a support, plotting on the same support the speed vector of the ship, examining whether the end of said vector is within or outside said dangerous heading and speed sectors, a collision risk existing when the end of the speed vector is within at least one of said dangerous heading and speed sectors, and in such case, choosing a new speed vector so as to make the end of such vector be outside the whole of the heading and speed dangerous sectors.

10 Claims, 8 Drawing Figures

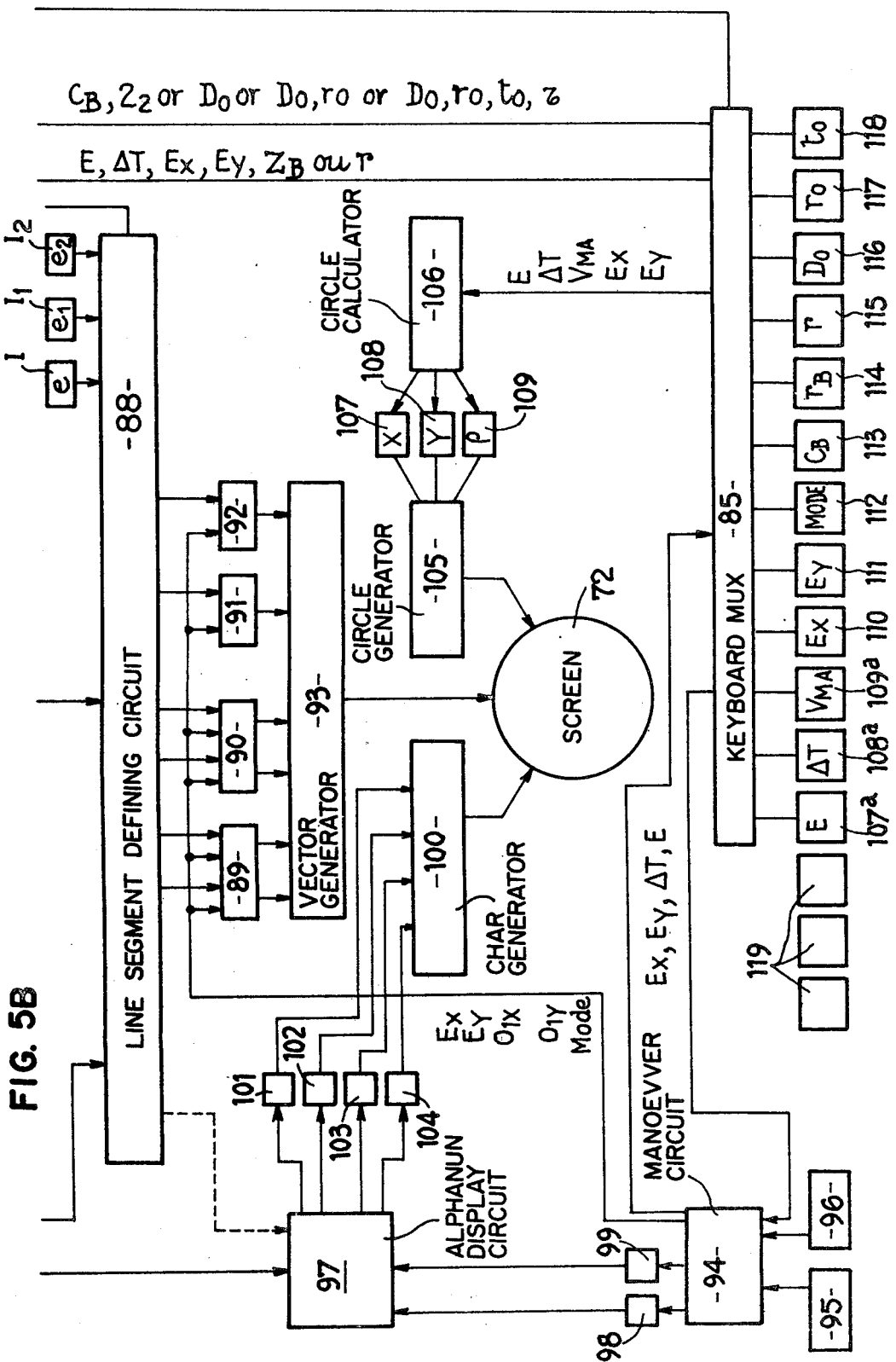

4,466,068

APPARATUS FOR THE DETECTION AND PREVENTION OF COLLISION RISKS IN DEEP SEA AND COASTAL NAVIGATION

BACKGROUND OF THE INVENTION

The present invention concerns navigational aid devices and relates more particularly to the detection and warning of collision risks in high sea and coastal navigation.

The introduction on board ships of all categories of radars has enabled navigators to assess the risks of collision with the obstacles which surround them.

Moreover maritime traffic surveillance stations have recently been created in many countries. Among other missions, these radar-equipped stations maintain a watch to prevent collision risks between ships.

If, on the radar screen carried by own ship A, the successive echos corresponding to a single fixed or moving target B are plotted, one can know the relative speed $\vec{V}_R$ of this target and thus assess:

the distance of closest point of approach, commonly designated in maritime parlance by the abbreviation DCPA,
the time of closest approach TCA,
the position of own ship A and that of the target B at the closest approach.

For some years, anti-collision systems based on calculators enable automatic plotting of targets surrounding own ship, and providing navigational aids to warn of collisions.

The principle of these systems consists in calculating the speed and heading of the targets which are within radar range, deducing by calculation the values of DCPA and TCA, signalling alarms to the navigator if these values become less than predetermined safely threshold values. Cartain more sophisticated systems can give indications of changes of heading to be effected by the ship to avoid a threatening obstacle and in certain cases indication of the effect of a modification of the speed.

However these systems make use of very long calculations and do not give simultaneously an overall view of the manoeuvre possibilities of own ship in heading and speed.

SUMMARY OF THE INVENTION

The invention aims to remedy these disadvantages of known systems by creating an entirely graphic process of detection and warning of collision risks which enables the navigator to appreciate rapidly and visually for each of the fixed or moving obstacles which surround him:

the risk of collision with that obstacle,
the value of the distance of closest point of approach,
the time of closest point of approach,
the position of own ship and that of the obstacle at closest point of approach,
heading and speed manoeuvres that he can make to pass at a safety distance from the obstacle, which he fixes in advance, without inasmuch risking a collision with another obstacle,
the effect of the manoeuvre that he will have decided to make.

The invention therefore has as object a method for detection and warning of collision risks between a ship and at least one moving or fixed obstacle marked on the on-board radar screen of the first ship, characterized in that it comprises determining relative to said obstacle, taking account of the parameters of its distance, speed and heading, a danger sector of heading and speed for said ship, plotting said danger sector of heading and speed on a support, plotting on the same support the speed vector of the ship, examining whether the end of said speed vector is inside or outside said danger sector of heading and speed, a collision risk existing when the end of the speed vector is inside said danger sector of heading and speed and, in that case, choosing a new speed vector such that its point is outside the danger sector of heading and speed.

BRIEF DESCRIPTION OF THE DRAWINGS

In the accompanying drawings, given only by way of example:

FIGS. 5A and 5B together form the system diagram of the apparatus of FIG. 4;

DETAILED DESCRIPTION OF THE PREFERRED EMBODIMENTS

Figure 1:
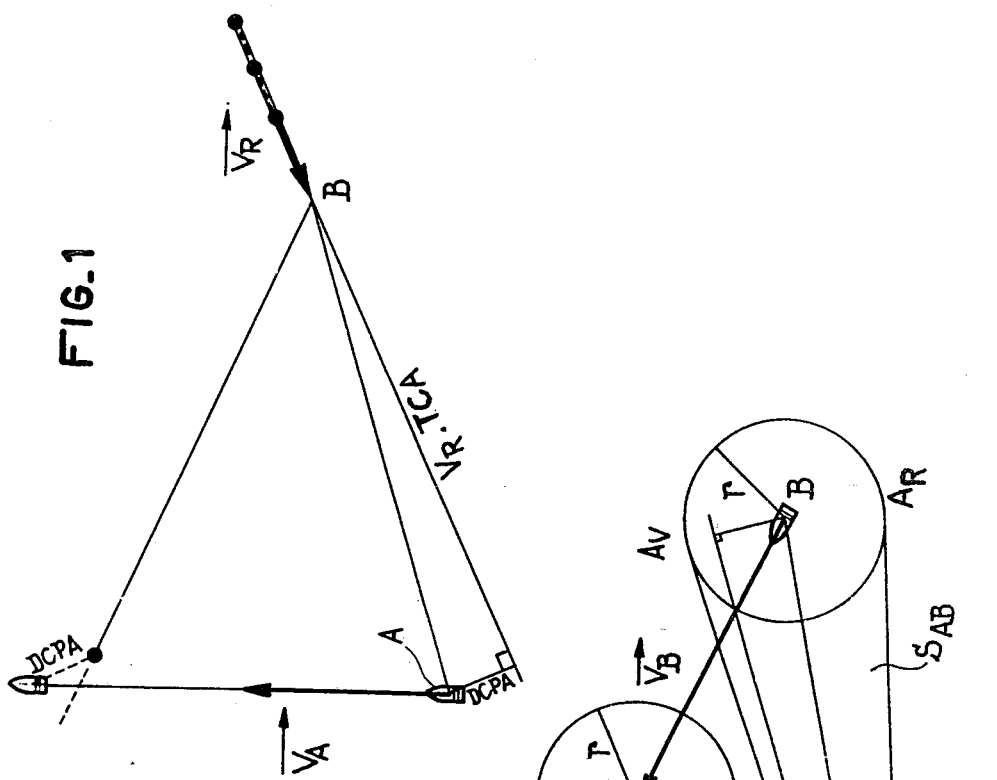
FIG. 1 is a diagram showing the geometrical construction of the magnitudes necessary for evaluation of the risks of collision between two ships.

Referring to the diagram of FIG. 1, it is assumed that the points A and B shown repesent respectively own ship and a target which is also constituted by a ship whose parameters have to be established by the navigational personnel on own ship with a view to assessing the relative situation of the two ships and the evolution or development and evaluation of this situation. On the heading marker of ship A is marked its speed in the form of a vector $\vec{V}_A$.

In addition, point A is joined to point B and the heading marker of ship B has been plotted and crosses the heading marker of ship A.

Adjacent to the intersection of the heading markers of ships A and B, the position of the ships when they are at the distance of closest point of approach DCPA and the DCPA are plotted in broken lines.

The DCPA has then been plotted starting at point A and a perpendicular dropped to this segment starting from point B to obtain thus the direction of relative speed $\vec{V}_R$.

The rectangular triangle thus formed has as sides the distance AB, the DCPA and the product $V_R \cdot TCA$.

Consequently, knowing the relative speed of ship B relative to ship A, which is given by the radar on board ship A, the time of closest approach TCA can easily be deduced.

However the indications given by the construction of FIG. 1, which are easy to obtain on board any ship equipped with navigational aids used hithereto, are far from sufficing to give the navigator precise indications concerning the manoeuvres he should undertake to avoid finding himself after a certain time in a delicate situation while modifying as little as possible the course to follow.

Figure 2:
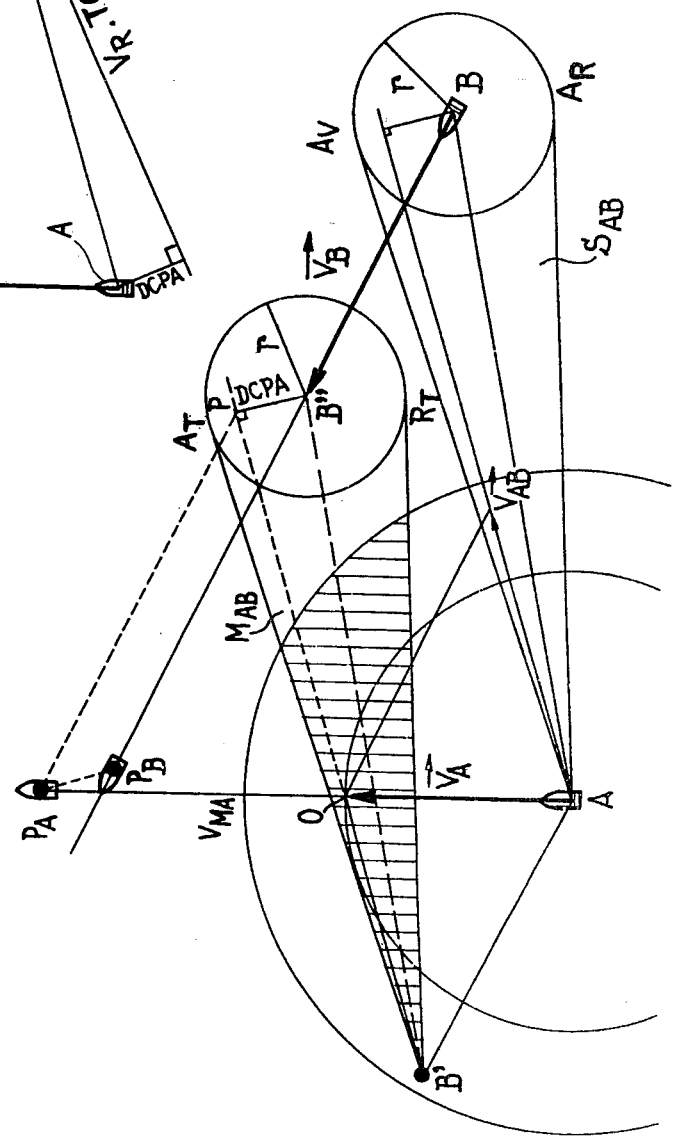
FIG. 2 shows a geometrical construction made by the process according to the invention applied to the assessment of the evolution of the relative situation of a first ship on which the method is used and a second ship.

The construction shown in FIG. 2 enables this problem to be solved.

To this end, the notion of "danger sector of heading and speed" for own ship relative to an obstacle is used, as defined below.

It is assumed that the speed and heading of own ship A are known, that is the vector $\vec{V}_A$, the speed and heading of ship B, that is the vector $\vec{V}_B$ (zero if the obstacle is fixed) and the distance AB which separates them at a given moment, taken at the time origin. The manner by which these elements are known will be described later.

Let r be the minimum distance of closest point of approach that the navigator of own ship A wishes to preserve relative to the obstacle B. This distance is represnted by a guard circle of radius r having B as centre.

Let $\vec{V}_{AB}$ be the relative speed of own ship A relative to the obstacle B obtained by vectorial subtraction:

$$\vec{V}_{AB} = \vec{V}_A - \vec{V}_B$$

Let $\overrightarrow{AA_V}$ and $AA_R$ be the segments tangent to the circle of radius r centred on obstacle B. The sector defined by segments $\overrightarrow{AA_V}$ and $AA_R$ is referenced $S_{AB}$ and, bisected by the segment AB.

The obstacle B will pass at a distance of closest point of approach DCPA from own ship A less than r if and only if vector $\overrightarrow{V_{AB}}$ falls within sector $S_{AB}$.

Moreover:
if $\overrightarrow{V_{AB}}$ falls between $\overrightarrow{AA_V}$ and AB, the obstacle will pass astern of own ship A;
if $\overrightarrow{V_{AB}}$ coincides with AB, the obstacle B is on a collision course with own ship A;
if $\overrightarrow{V_{AB}}$ falls between AB and $AA_R$, the obstacle B will pass ahead of own ship A.

The danger sector of heading and speed of ship A relative to the obstacle B noted later by $M_{AB}$, which forms the theoretical basis of the invention, is obtained by a vectorial translation $\vec{V}_B$ of the sector $S_{AB}$.

Let B' and B" be the points A and B respectively transformed by the translation $\vec{V}_B$.

The vector joining B' and the end O of the vector $\vec{V}_A$ is equal to the relative speed vector $\overrightarrow{V_{AB}}$.

Let $B'A_T$ and $B'R_T$ be the segments $\overrightarrow{AA_V}$ and $AA_R$ respectively transformed by the translation $\vec{V}_B$.

Let P be the point obtained by dropping from the poing B" the perpendicular to the direction B'O.

B"P represents the value of the DCPA.

Taking account of the construction shown in FIG. 1, the value of of TCA is obtained by establishing the ratio of the segment B'P to the segment B'O.

The position $P_A$ of own ship and the position $P_B$ of the obstacle B at the closest point of approach are obtained by displacing the segment B"P parallel to itself following the direction $\vec{V}_B$ until intersection with the coarse of own ship A.

This simple transformation of sector $S_{AB}$ enables the navigator of own ship A to interpret the situation by reasoning, not from his relative speed relative to obstacle B, but directly from the speed vector of his own ship in the way which will now be described.

Assuming that the speed vector of obstacle B does not vary, the navitagor examining a display corresponding to that shown in FIG. 2 can rapidly come to the following conclusions:
if the point O, the end of a speed vector $\vec{V}_A$ of own ship, is outside the sector $M_{AB}$, he is sure that ship A will pass at a distance of closest point of approach to obstacle B, greater than r.
if the point O is inside the half-sector $B"B'A_T$, the ship will pass in front of obstacle B with a DCPA less than r.
if the point O is on the segment B'B", the navigator sees that he is on a collision course with the obstacle B.
if the point O is inside the half-sector $B"B'R_T$, the ship A will pass behind the obstacle B with a DCPA less than r.

Thus by simple inspection of the point O and of the sector $M_{AB}$, the navigator of own ship can appreciate that there is a risk of collision with obstacle B, know the values of DCPA and TCA and, in addition, the positions $P_A$ of his ship and $P_B$ of obstacle B at the closest point of approach.

It then remains to determine the avoidance manoeuvre that own ship A must perform in order to pass at a closest point of approach to the obstacle B greater than the safety threshold value r.

In general, the manoeuvre of a ship is characterized by:
either an increase or decrease of its speed, going as far as stopping, without change of heading,
or a combined action on heading and speed.

Let $\vec{V}_{MA}$ be the maximum speed that the ship can reach.

The disc, in the mathematical meaning of the term, centred on own ship A and of radius $V_{MA}$ represents the locus of the end of the speed vector of own ship A if it varied its heading in all possible directions and if it modified its speed to all possible values.

Assume that the navigator of own ship A notices the risk of collision with obstacle B by making the construction of FIG. 2. In this case, it is for own ship A to manoeuvre, obstacle B keeping its heading and speed.

The navigator can choose any solution of change of heading and/or modification of speed which takes the end of his new speed vector outside the sector $M_{AB}$ and which stays within the manoeuvre space.

He is then sure to pass ahead or astern of obstacle B with a distance of closest point of approach greater than the safety threshold r which he has fixed.

The invention, starting from the notion of "Danger Sector of Heading and Speed" $M_{AB}$ enables the navigator of own ship A to appreciate clearly and rapidly the risk of collision with an obstacle B, and gives him clearly and rapidly all the manoeuvres which will enable him to pass at a distance of closest point of approach to obstacle B greater than the threshold r.

It is up to the navigator to choose the solution as a function of the international rules fixing the right of way of ships where a collision risk exists, and giving manoeuvre rules.

In addition, the navigator can choose the appropriate safety threshold as a function of the situation and even choose different thresholds for an obstacle B passing ahead or astern.

Figure 3:
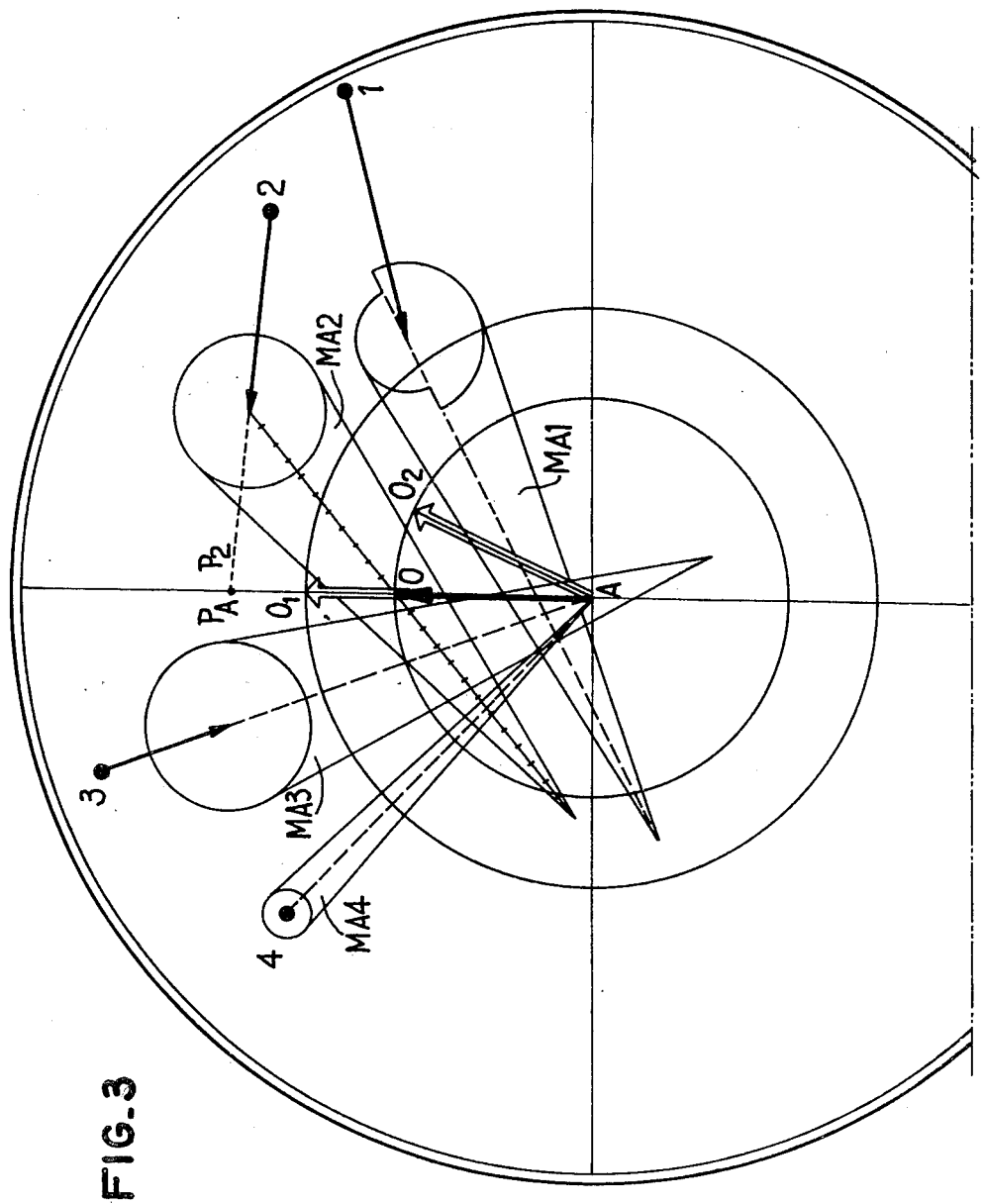
FIG. 3 shows the application of the method of the invention to several moving or fixed obstacles with which a ship risks entering into collision.

The following description given by way of non-limiting example with reference to FIG. 3, will explain how the invention can be applied to the case of own ship surrounded by several fixed or moving obstacles.

Own ship A is surrounded by four obstacles. The obstacles 1, 2 and 3 are moving, the obstacle 4 is fixed.

Assumed that it is necessary to keep a safety DCPA of 0.1 miles relative to fixed obstacle 4, and for obstacle 1 a safety DCPA of 0.3 miles if ship A passes in front of the obstacle and a safety DCPA of 0.5 miles if it passes behind the obstacle.

Own ship A is moving at 12 knots and an extrapolation of the positions for the next 6 minutes is considered; thus the length AO represents the distance that own ship A will cover in the six minutes, that is 1.2 miles.

Obviously, the application of the invention can leave to the navigator the choice of the space and time scales.

The navigator of own ship A plots the danger sectors of heading and speed for each of the obstacles 1 to 4 in the manner indicated with reference to FIG. 2, and then notes:

that he is currently on a collision course with obstacle 2, since the end of his speed vector falls on the bisection of sector $MA_2$. In the absence of any reaction, the collision would be produced at point $P_a$, 2.4 miles ahead, in 12 minutes, that there is no current risk of collision with the other three obstacles.

Assume that the navigator wishes to avoid immediately the danger relative to obstacle 2, without by so doing creating a risk of collison with any of the other three obstacles.

He must choose a change of heading and/or of speed which brings the point O outside the four danger sectors of heading and speed relating to the four obstacles.

He can for example choose to accelerate to 19 knots, keeping his current heading (point $O_1$) or he can turn 25 degrees to the right, keeping his current speed (point $O_2$).

In this example, a reduction of speed while keeping his current heading would be dangerous since, to avoid the obstacle 2, he would find himself in risk of collision with obstacle 3 and possibly with obstacle 1.

A digital device will now be described for displaying the danger sector of heading and speed for each obstacle round own ship and enabling the navigator to have an overall view of the risks he runs and all the manoeuvres of heading and/or speed which would enable him to avoid these collision risks and avoid creating new risks, by passing at a distance of closest point of approach to each obtacle greater than the safety threshold which he has fixed for each of them.

This digital apparatus can be installed on the bridge of own ship.

Figure 4:
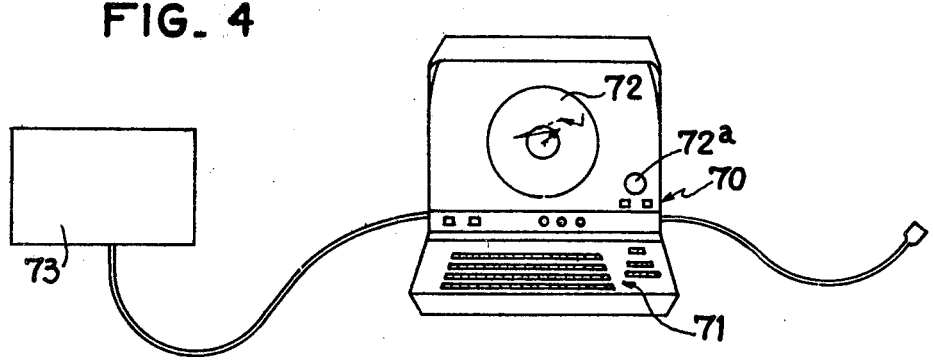
FIG. 4 is a diagrammatic view of an electronic apparatus for detecting and warning of collision risks according to the invention.

As shown in FIG. 4, it comprises a terminal 70 presenting an alphanumeric keyboard 71, a display screen 72 and a device 72a consisting of a ball intended to control the displacement of a marker on the screen 72. The terminal also includes a set of memory circuits and calculation circuits whose diagram is shown in FIGS. 5A and 5B.

The terminal 70 is connected to an automatic electronic system for plotting the echos from the radar with which own ship is assumed fitted.

Figure 5A:
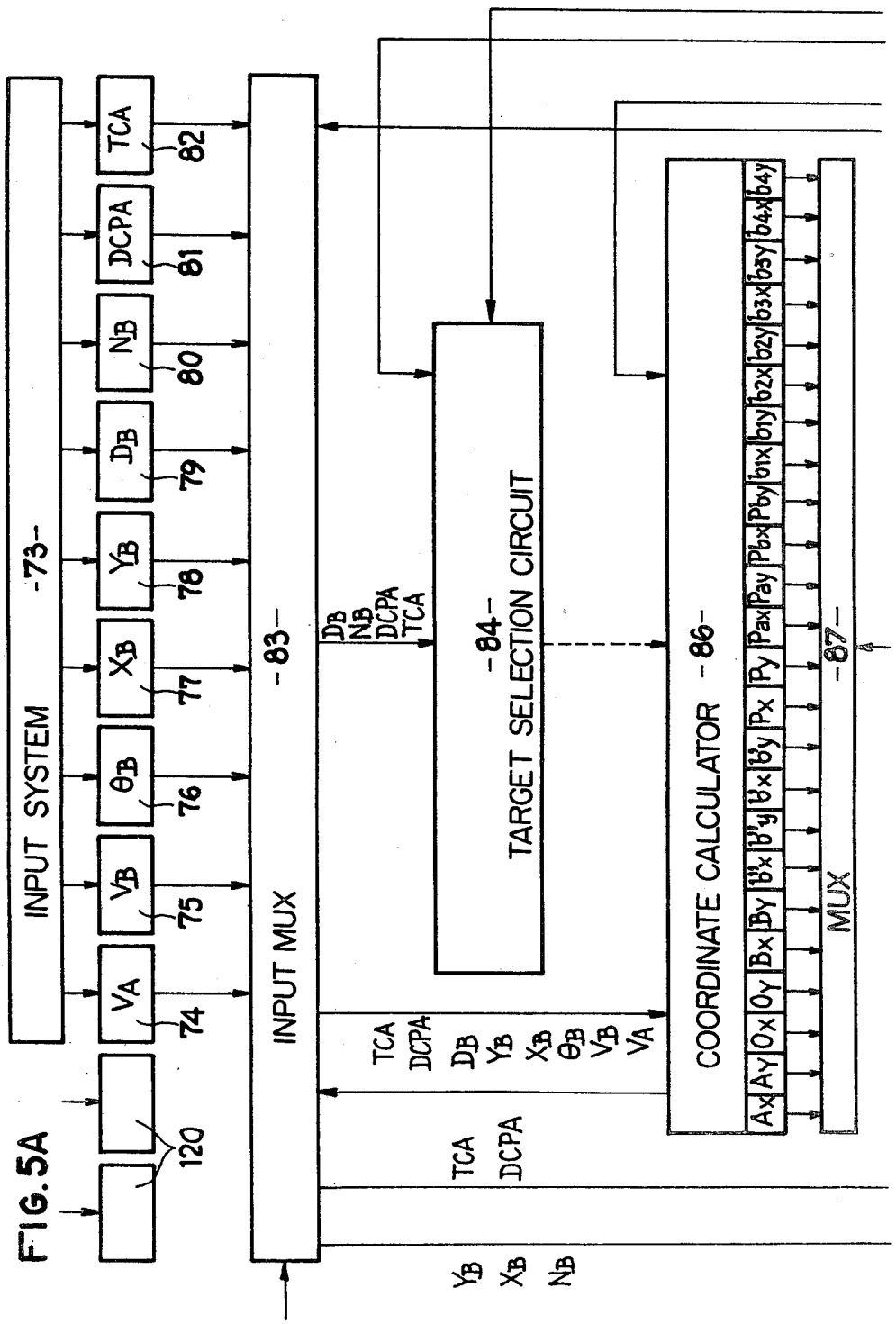

The circuit shown in FIGS. 5A and 5b comprises the system 73 whose outputs give the speed $\vec{V}_A$ of own ship A and the following data for a given target B:

speed $V_B$ of target B heading $\theta_B$ of target B cartesian coordinates $X_B$ and $Y_B$ of target B distance $D_B$ separating own ship A and target B identification code $N_B$ of target B distance of closest point of approach DCPA between own ship A and target B time TCA at the end of which DCPA is reached.

Each of these outputs is connected to a shift register 74 to 82 for storing the corresponding data.

The outputs from registers 74 to 82 are connected to corresponding inputs of an input multiplexer 83 whose outputs shown in FIG. 5A by a single conductor are connected to corresponding inputs of a target selection circuit 84 which receives from it the data coming from registers 79 to 82.

The selection circuit is also connected to a multiplexer 85 associated with the keyboard 71 (FIG. 5B).

The output of selection circuit 84 is connected to an input of a set 86 of circuits for calculating the coordinates of the points which constitute the ends of the straight line segments used to establish the danger sectors of heading and speed.

The set 86 is also connected directly to the input multiplexer 83 and to the keyboard multiplexer 85.

The outputs of the set 86 are connected to the corresponding inputs of a point or intermediate multiplexer 87 connected to a set of circuits 88 for defining the segments to be displayed with: a continuous or interrupted mode (FIG. 5B), this set being also connected to the input multiplexer 83.

The outputs of the set 88 for defining the segments to be displayed are connected through registers 89 to 92 to a generator vector 93 generating vectors in the continuous or interrupted mode.

The registers 89 to 92 comprise additional inputs connected to a set 94 of manoeuvre circuits associated with ball 72a (FIG. 4).

The set 94 is connected to two registers 95 and 96 for storing the coordinates representative of the displacements of the ball 72a.

The set 94 controls an alphanumeric display circuit 97 to which it is connected through registers 98 and 99. The display circuit 97 is connected to a character generator 100 through registers 101 to 104. The circuit 97 is also connected to the input multiplexer 83.

The character generator 100 is intended to control the display of characters on the cathode ray tube 72 which is also connected to the vector generator 93 and also to a circle generator 105 controlled by a calculation circuit 106 through registers 107 to 109.

The circuit 106 is connected to the keyboard multiplexer 85.

Registers 107a, 109a and 110 to 118 are associated with the keyboard multiplexer for storing the data typed on the keyboard.

To these registers, as with registers 74 to 82 for storing the input data, are respectively added registers 119 and 120 intended to be used during extension of the usage of the apparatus to a shore station.

Figure 6:
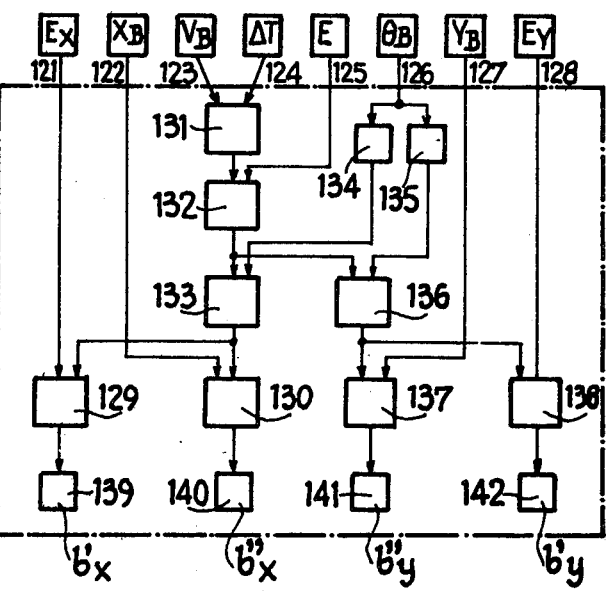
FIG. 6 shows in more detail part of the diagrams of FIGS. 5A and 5B.

The set 86 of coordinate calculation circuits will now be described in more detail in the form of a circuit for calculating the coordinates of the points b' and b" which are the ends of the segment defining on the screen of FIG. 7 the distance between own ship A and a target B. As can be seen in FIG. 6, it comprises registers 121 to 128 for storing data relating to the point B, to the speed of target B, to the heading of the target and from which the coordinates of points b' and b" can be calculated.

The register 121 is connected to a first input of an adder 129.

The register 122 is connected to a first input of an adder 130.

The registers 123 and 124 are respectively connected to two inputs of a multiplier 131 whose output is connected to a first input of another multiplier 132, the other input of this multiplier being connected to the output of register 125. The output of the multiplier 132 is connected to an input of a multiplier 133 of which another input is connected to the output of a cosine function generator 134. The input of this generator is connected to the output of the register 126 which is also connected to a sine function generator 135. The output of the generator 135 is connected to an input of the multiplier 136 whose other input is connected to the output of the multiplier 132.

The output of the multiplier 133 is connected to an input of the adder 129 and to an input of the adder 130 while the output of the multiplier 136 is connected to an input of each of the two adders 137 and 138 whose other inputs are respectively connected to the circuits 139, 140; 141 and 142 for storing the relevant coordinates.

Of course, the circuit 86 includes similar circuits to that which has just been described for calculating the coordinates of other segment ends.

In what has just been described, the generators 93, 100 and 105 as well as the cathode ray tube are available commercially. The graphic console manufactured by CIT Alcatel, model VG 1610 comprises, among others:

(a) a four colour circular cathode ray tube (item 72). This tube is a component of a display unit comprising the CRT tube itself and the associated electronic circuits. The CRT comprises a single cathode ray gun having variable penetration on a two level color screen having a potential barrier. The screen comprises two layers of phosphorescent material which when illuminated by the cathode rays have red and green aspects, respectively. The red color is selected with relatively low anode potential and the green color with relatively high anode potential. Thus, a variation of the anode potential causes a color scale between red and green to be displayed.

The electronic control comprises the deviation amplifiers, the adjustable anode voltage supply and focus circuits. Deviation is in the X and Y directions and of the electromagnetic type. Modulation of the beam intensity is obtained by means of a wide band amplifier controlling the grid of the tube.

(b) an up-date ferrite core memory having an image refresh frequency of 30–50 Hz. This memory stores in digital form the images to be displayed on the screen. The visualisation data are determined by the contents of this memory so that computation of new data is only necessary when there is a variation of information to be displayed on the screen. The graphic instructions required for image composition are the writing of line segments or vectors, the absolute or relative positioning, and the writing of characters.

(c) a digital vector generator corresponding to generator 93. This is an integrated circuit capable of computing data determining the length and the inclination angles of the vectors to be displayed. A binary frequency multiplier is used for generating an X pulse train and a Y pulse train which are applied to respective up-down counters in order to make them count up or down for generating the vector data. The counters are connected to D/A convectors controlling the deviation circuits of the CRT.

(d) a character generator enabling four sizes of displayed characters which can form generator 100. This generator comprises a PROM memory having stored therein 64 characters on 6 bits in ASCII code configuration.

(e) a hardware circle generator corresponding to generator 105. This generator allows for the writing of circles having optionally two diameters. The instruction controlling the display of a circle on the screen is processed as a character.

(f) an alphanumeric keyboard with function keys (item 85). This keyboard permits inputting of data on ASCII code basis in the system. The function keys generate a five-bit code, the interpretation of which can be determined by software, and (g) a rolling ball similar to the ball 72a of FIG. 4. This device generates X and Y information sent to the system in order to display a cursor on the screen. When used, the operator moves the cursor on the displayed element to be designated and then validates the designation by means of a function key of the keyboard. This function key triggers processing of the designated element by means of its coordinates in the system.

In addition this consol includes a graphic generator suitable for dialogue management and for management of the memory associated with the cathode ray tube.

The calculation circuits which have been described comprise multipliers, dividers, adders and trigonometric circuits of the usual kind.

The apparatus which has just been described with reference to FIGS. 5A, 5B 6 operates in the following manner.

The electronic system for automatically plotting the radar echos, which is an apparatus of known kind, enables the display on the ship-board radar screen the echo of targets B round own ship A, the identification codes $N_B$ corresponding to these targets, and the speed vectors $\vec{V_B}$ of these targets.

The data produced periodically by the system for automatically plotting the radar echos and used by the apparatus of the invention are the following:

speed ($V_A$) of own ship A (in knots),
speed ($\vec{V_B}$) of the target B (in knots),
heading ($\theta_B$) of the target B,
cartesian coordinates ($X_B$) and ($Y_B$) of the target B,
distance ($D_B$) separating own ship A from the target B,
identification code ($N_B$) of the target B,
distance of closest point of approach separating own ship A from target B (DCPA),
time at the end of which the DCPA is reached (TCA).

These data are stored in the registers of the apparatus according to the invention.

Using the alphanumeric keyboard 71 (FIG. 4), the operator enters the data intended to be used with a view to display of the image on the screen.

These data are the following:
scale of the image to be obtained (E),
time scale $\Delta T$, for the representation of the speed vectors of own ship A and of the selected targets,
maximum speed $\vec{V_{MA}}$ that own ship A can reach (in knots),
coordinates of the position of own ship A on the screen, EX, EY in the off-centre case; (EX- = EY = 0 if own ship is placed at the centre of the screen), mode for selection of the targets, which can be manual or automatic.

In manual mode, the operator defines on the keyboard:

the codes $C_B$ of the targets he wishes to display (after inspection of the display screen of the ship radar on which the targets and their identification codes are presented), the safety threshold $r_B$ that the operator wishes to guarantee relative to each target he has chosen.

The keyboard enables at least 10 targets to be entered in this way. For this purpose, the set of registers, associated with the keyboard comprises as many pairs of registers similar to the pair of registers 113, 114 as there are targets to be selected.

In automatic mode, the automatic selection of targets round own ship is performed according to three criteria:

the distance separating own ship A from the targets surrounding it must be less than a value Do. The operator thus types on the alphanumeric keyboard 71 the value of Do, and the safety threshold r he wishes to guarantee relative to the targets, the distance separating own ship from the targets round it must be less than a value Do and the DCPA separating own ship from the targets round it must be less than a value ro. The operator types on the alphanumeric keyboard 71 the values of Do.ro and r, the distance separating own ship from the targets round it must be less than a value Do; the DCPA separating own ship from the targets round it must be less than a value Co, the TCA corresponding to the DCPA must be less than a value to. The operator types on the alphanumeric keyboard the values of Do, ro, to and r, the three selection criteria mentioned above are given by way of example and different criteria could be contemplated.

The data output from the alphanumeric keyboard is stored in the keyboard registers.

Figure 7:
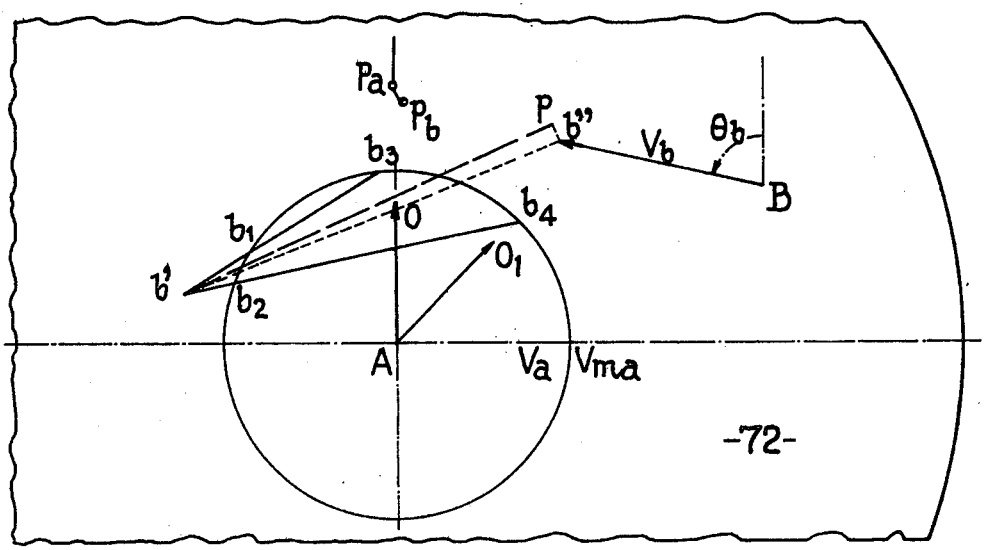
FIG. 7 is a part view of the display screen of the apparatus of FIG. 4, showing the information relating to the situation of own ship relative to the obstacles at a given moment.

A last source of input is the ball 72a enabling the operator, after inspecting the image displayed on the screen of the apparatus, to indicate on this screen a point $O_1$ representing the end of a speed vector of own ship A, connected with a manoeuvre chosen by the operator to avoid a possible conflict (FIG. 7). The cartesian coordinates $O_{1X}$ and $O_{1Y}$ are stored in the two registers 95 and 96 (FIG. 5B).

The multiplexer 85 connected to the keyboard 71 actuates the circuit 106 and transmits to it the information E, T, $\vec{V}_{MA}$, EX, EY.

The function of circuit 106 is to calculate the cartesian coordinates (X, Y) of the centre of the circle in a cartesian system connected to own ship A (see FIG. 7) as well as the radius p of the circle: X, Y and p are stored in the registers 107, 108, 109.

The circuit 106 then orders the circle generator 105 to proceed to the display of the circle of centre A and of radius $\vec{V}_{MA}$ on the screen 72. The apparatus then awaits reception of data relating to a target.

The data corresponding to the acquisition of a target by the electronic system 73 for automatically plotting radar echos are entered into the input registers 74 to 82 connected to the multiplexer 83. The multiplexer 83 transmits to the selection circuit 84 the data $N_B$, $D_B$, DCPA, TCA relating respectively to the identification code of the target B, the distance separating own ship A from the target B, the distance of closest point of approach, and the time of closest approach.

The selection circuit 84 actuates the keyboard multiplexer 85 and receives from it the information about selection mode, and according to the selection mode (manual or automatic): Do, ro, to, or ($C_B$, $r_B$) retains or not the target having code $N_B$.

If the target is not retained, the apparatus goes on stand by. Otherwise, the circuit 84 triggers the coordinate calculation circuit 86.

The point coordinate calculation circuit:

actuates the multiplexer 83 and receives from it the information $\vec{V}_A$, $\vec{V}_B$, $\theta_B$, $X_B$, $D_B$, DCPA, TCA, actuates the multiplexer 85 and receives from it the information E, $\Delta T$, r (or $r_B$ according to the selection mode), EX, EY;

calculates in order the coordinates of the points A, O, B, b'', b', P, Pa, Pb, $b_1$, $b_2$, $b_3$, $b_4$ (FIG. 7);

transmits these coordinates to the multiplexer 87 which actuates the circuit 88 defining the segments to be displayed.

The circuit 88 combines for each of the segments to be displayed, the coordinates of its origin, of its end, defines the tracing mode (continuous or interrupted) and in the case of interrupted tracing, the length L of the dashes.

Referring to FIG. 7, it will be seen that the segments to be displayed on the screen 72 are:

the speed A0 of own ship A to be shown as a continuous trace, the speed Bb'' of the target B to be shown as a continuous trace, the segments b'$b_4$ and b'$b_3$ defining the danger sector of heading and speed for the target B, to be shown as a continuous trace, the bisection b'b'' of the danger sector to be shown as an interrupted trace, to count directly the distance between own ship and the target, the segment b''p indicating the DCPA to be shown as an interrupted trace, the segment b'p representing the product of the relative speed of the target B with the TCA to be shown as an interrupted trace so as to be able to count directly the TCA, the segment papb showing the relative position of own ship and the target at the closest point of approach, to be shown as an interrupted trace.

For the interrupted traces, three constants I, $I_1$, $I_2$ placed in the read only memories associated with the circuit 88 are used for defining the dash length L.

To effect these operations, circuit 88:

actuates multiplexer 87 and receives from it the coordinates relating to the ends of the successively processed segments, actuates the multiplexer 83 and receives from it the DCPA and the TCA (this operation only occurs when the segments b'b'', b''p, b'p, and papb are processed) for calculating the dash length, performs the calculation of L, actuates the vector generator 93 the information of origin, end, mode, L to enable the corresponding segment to be displayed on the screen 72.

This is repeated for each of the segments to be processed. When the processing of the last segment is completed, the circuit 88 triggers the alphanumeric marking circuit 97.

The marking circuit 97
again triggers the input multiplexer 83 and receives from it the data $N_B$, $X_B$, $Y_B$ for the identification and coordinates of the target B determines the code C, the size T of each character forming the code $N_B$, and the coordinates X, Y where the character should be placed on the screen triggers the character generator 100 and transmits to it the information C,T,X,Y to proceed to the display on the screen.

The apparatus then goes on stand by and awaits reception of data relating to a new target.

When the indicator ball 72a is validated (indication by the operator of the point $O_I$ of coordinates $O_{IX}$ and $O_{IY}$) an interruption occurs, and the manoeuvre circuit 94 is triggered as soon as possible.

The manoeuvre circuit 94:
actuates the keyboard multiplexer and receives the data EX, EY, ΔT, E;

actuates the vector generator 93 and transmits to it the data EX, EY, $O_{IY}$, Continuous trace, to proceed to the display of segments $AO_I$ on the screen;

performs the calculations of heading $\theta_A$ and speed $V'_A$ corrsponding to the manoeuvre chosen by the operator actuates the marker circuit 97 and transmits to it the data $\theta_A$ and $V'_A$.

The circuit 97 orders the marking of the data produced.

In the above, it was assumed that the process and apparatus according to the invention were applied on board a moving ship.

However there are no fundamental modifications to be made if such an apparatus is installed on shore. Each ship appearing in the surveillance zone is characterised by its position (cartesian coordinates X, Y relative to a chosen reference) its heading $\theta$, its speed V, and its identification code.

These data are produced by an electronic system for automatically plotting radar echos coorresponding to system 73 but installed on shore. Some additional registers have to be provided in the apparatus (particularly for the data $X_A$, $Y_A$, $\theta_A$). Such registers have been shown at 120 in FIG. 5A.

In a shore station, the operator anticipating difficulties within a group of ships can, as described above, select these ships on the alphanumeric keyboard 71 (FIG. 4) so as to display the manoeuvre space of each of these ships and then inform them of the situation they are in and the measures they can take to eliminate any risk of collision.

Moreover, the functions fulfilled by the circuit of FIGS. 5A and 5B can also be fulfilled by a computer associated with a display consol and suitably programmed.

Having now described our invention what we claim as new and desire to secure by Letters Patent is:

1. In combination an automatic radar plotting aid system and an apparatus for assessing maneuvers as concerns heading and/or speed to be carried out by a first vehicle in order to avoid collision with other vehicles and/or obstacles, said apparatus comprising:
   (a) electronic means connected to said aid system for memorizing data input signals provided by said system and representing the coordinate signals and movement parameters of said first vehicle and said others vehicles and/or obstacles;
   (b) order signal generating means;
   (c) computing means connected to said order signal generating means and said electronic means for computing from said order signals and said memorized signals, the present velocity vector of said first vehicle and dangerous sectors peculiar to each of said other vehicles and/or obstacles;
   (d) visualization means for displaying said present velocity vector and said dangerous sectors on a display means, in order to ascertain:
      (i) if said first vehicle would pass at a distance lower than predetermined safety distances, respectively ahead or astern with respect to at least one of said other vehicles and/or obstacles, if the end of the instantaneous speed vector is located within the sector corresponding to said other vehicle and/or obstacle;
      (ii) if said first vehicle would pass at a distance higher than or equal to said safety distances ahead or astern with respect to the remaining other vehicles and/or obstacles by checking after a modification of speed and/or heading of said first vehicle if the end of the new velocity vector is loacted outside all the peculiar sectors computed and displayed for said other vehicles and/or obstacles;
   (e) said computing means comprising means for calculating for each of said sectors the ends of at least three straight line segments, said visualization means and said computing means comprising means for defining said at least three segments by means of the interesting points of three half lines and a circle the center of which represents said first vehicle and the radius of which is determined by a vector representing maximum velocity of said first vehicle, said at least three half lines being the following:
      (i) a half line called collision line resulting from a translation over a distance equal to the present velocity vector of the other vehicle and/or obstacle, of a half line extending between said center and a point representing said other vehicle and/or obstacle, whereby said first vehicle will run into said other vehicle and/or obstacle if the end of its present velocity vector coincides with a point of said collision line;
      (ii) a half line called ahead passage line having the same origin as said collision half line and making an angle therewith the sinus of which equals the quotient of said safety distance ahead and of the present distance between said first vehicle and said other vehicle and/or obstacle;
      (iii) a halfline called astern passage line having the same origin as said collision half line and making an angle therewith, the sinus of which equals the quotient of said safety distance astern and of the present distance between said first vehicle and said other vehicle and/or obstacle.

2. A combination as claimed in claim 1, wherein said visualization means further comprises means for selecting the display of said sectors in a continuous or in an interrupted mode, whereby each section of a displayed sector in the interrupted mode, corresponds to a given unity value of a parameter.

3. A combination as claimed in claim 2, wherein said parameter is distance.

4. A combination as claimed in claim 2, wherein said parameter is time.

5. A combination as claimed in claim 1, wherein said computing means and said visualization means comprise means for selecting the display mode of said sectors as a fonction of time of closest approach of said first vehicle with respect to said other vehicles and/or obstacles.

6. A combination as claimed in claim 1, wherein said apparatus further comprises means for visualizing a maneuver as concerns heading and speed choosen for said first vehicle as a function of its present speed and the relative locations of said sectors.

7. A combination as claimed in claim 1, wherein said apparatus comprises a first multiplexer, first registers connected between said multiplexer and said aid system for storing informaion supplied thereby, a second multiplexer, an alphanumerical keyboard, second registers connected between said second multiplexer and said alphanumerical keyboard for storing data entered by said keyboard, and a target selection circuit connected to the first and second multiplexers for calculating the coordinates of points related to the selected target.

8. A combination as claimed in claim 7, wherein said computing means comprise a set of circuits for determining the segments to be displayed, connected to a third multiplexer and controlling a vector generator whose output is connected to a cathode ray tube of said display means.

9. A combination as claimed in claim 8, further comprising a ball device for target indication connected to a manoeuver circuit which in turn is connected on one hand to said vector generator and on the other hand to an alphanumeric marker circuit intended to control a generator of characters to be marked on the cathode ray tube, said alphanumeric marker circuit being also connected to said first multiplexer.

10. A combination as claimed in claim 9, further comprising a circuit connected to the second multiplexer and intended to control a circle generator to cause marking on said cathode ray tube of the speed circles of the first vehicle.

* * * * *